(12) United States Patent
Tsai et al.

(10) Patent No.: US 6,789,023 B2
(45) Date of Patent: Sep. 7, 2004

(54) METHOD OF INSTANT ESTIMATION OF A LOAD MOTOR INERTIA

(75) Inventors: Ching-Hsiung Tsai, Tainan (TW); Po-Ming Chen, Tainan (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 10/419,196

(22) Filed: Apr. 21, 2003

(65) Prior Publication Data

US 2004/0148110 A1 Jul. 29, 2004

(30) Foreign Application Priority Data

Jan. 24, 2003 (TW) .................................... 92101612 A

(51) Int. Cl.[7] ............................................. G06F 19/00
(52) U.S. Cl. ......................................... 702/33; 702/57
(58) Field of Search ................................ 318/677, 826, 318/490, 561, 563, 565; 702/33, 38, 41, 43, 44, 60, 61, 105, 113, 114, 115, 64, 66, 79, 179, 189, 190, 194

(56) References Cited

U.S. PATENT DOCUMENTS

| | | | | |
|---|---|---|---|---|
| 4,744,041 A | * | 5/1988 | Strunk et al. .................. | 702/84 |
| 4,912,387 A | * | 3/1990 | Moulds, III .................. | 318/629 |
| 4,950,967 A | * | 8/1990 | Sakamoto et al. .......... | 318/567 |
| 5,786,678 A | * | 7/1998 | Kobayashi et al. .......... | 318/677 |
| 6,232,737 B1 | * | 5/2001 | Kachi et al. ................. | 318/610 |
| 6,320,338 B1 | * | 11/2001 | Kang ......................... | 318/430 |

OTHER PUBLICATIONS

Shynk, J; Roy, S; "Analysis of the Momentum LMS Algorithm"; IEEE Transactions on Acoustics, Speech and Signa Processing; vol. 38, issue 12; Dec. 1990; pp 2088–2098.*

Tugay, M; Tanik, Y; "Properties of the Momentum LMS Algorithm"; Proceedings Integrating Research, Industry an Education in Energy and Communication Engineering Electrotechnical Conference; Apr. 11–13, 1989; pp 197–200.*

Yen–Shin, L; Juo–Chiun, L; Jennshing, J; "Direct Torque Control Induction Motor Drives with Self–Commissioning Based on Taguchi Methodology"; IEEE Transactions on Power Electronics; vol. 15, issue 6; Nov. 2000; pp 1065–1071.*

Syaed, A; Hassibi, B; Kailath, T; "Inertia Properties of Indefinte Quadratic Forms"; IEEE Signal Processing Letters; vol. 3, issue 2; Feb. 1996; pp 57–59.*

Lin, P; Messal, E; "Design of a Real–Time Rotor Inertia Estimation System for DC Motors with a Personal Computer"; Conference Record 8th IEEE Instrumentation and Measurement Technology Conference; May 14–16, 1991; pp 292–296.*

* cited by examiner

Primary Examiner—John Barlow
Assistant Examiner—Douglas N Washburn
(74) Attorney, Agent, or Firm—Birch, Stewart, Kolasch & Birch, LLP

(57) ABSTRACT

A method of instant estimation of the rotor inertia of a load motor is disclosed. The adaptive filter accompanied with the Least Mean Square Rule is introduced to instantly estimate the rotor inertia of a load motor. One input of the adaptive filter is the current signal of a model motor whose rotor inertia is known, and the other is the deviation current signal between the model motor and the drive motor. Once the two inputs are determined, the rotor inertia of the load motor will then be calculated using the Least Mean Square Rule and the adaptive filter.

8 Claims, 10 Drawing Sheets

W$_{1k}$]$^T$ to represent the actual signal weight vector.

METHOD OF INSTANT ESTIMATION OF A LOAD MOTOR INERTIA

BACKGROUND OF THE INVENTION

1. Field of Invention

The invention pertains to a method of estimating rotor inertia and, in particular, to a method of instant estimation of a load rotor inertia in an AC servo driver.

2. Related Art

The basic structure of an AC permanent synchronous motor is similar to the conventional synchronous motor. The stator side has a three-phase coil set and the rotor side has a permanent magnet to generate a magnetic field. It does not have a magnetic field excitation circuit, sliding ring, or electric brush. It has the advantages of a high power-volume ratio, high efficiency, and low torque vibrations. Therefore, it is ideal for applications of the drivers in a precision servomechanism, such as a machining mechanical platform with a high precision and a high response speed.

Among the widely used servo control systems, the rotor inertia of a load is an important parameter in the servo design. This parameter has to be accurately estimated in order to make accurate controls of the servo.

Due to the rapid development of digital signal processors, the AC servo drivers have the trend of being intelligent, enabling the AC servo driver to understand the changes in itself and its environment. By intelligence we mean that there are fewer human settings so that it becomes much easier for users to manipulate.

In order to obtain a truly intelligent AC servo driver, the rotor inertia has to be accurately estimated. Some driver designs take the load rotor inertia as an input from the user. This method is less flexible. If users may not know what the load rotor inertia means, then it is difficult for the product to compete with other intelligent products.

Therefore, it is of great importance to provide an estimation method of the load rotor inertia, so that the servo can truly achieve the goal of intelligent operations.

SUMMARY OF THE INVENTION

In view of the foregoing, an objective of the invention is to provide a method of instant estimation of the rotor inertia of a load rotor. The rotor inertia of a controlled motor driven by a drive motor is estimated instantly so as to adjust the output of the driver motor, thereby achieving the goal of instant estimation and accurate control.

The disclosed method compares a model system and an actual system to obtain a relative signal. An adaptive filter and the Least Mean Square (LMS) Rule are employed to obtain the parameter of the controlled object.

According to the disclosed method, a motor mechanics control circuit is taken as an ideal model, whose rotor inertia is known. Its speed controller output is one of the input signals for the adaptive filter. The output of a drive motor speed controller in a coupled system and the output of the model motor speed controller are compared to give a deviation quantity as the ideal signal of the adaptive filter. The rotor inertia of the load is then estimated by the adaptive filter using a predetermined algorithm.

To achieve the above objective, the disclosed method first determines an input signal and an ideal signal from a servo control system as two input signals for an adaptive filter. The input signals pass through at least one delayer to obtain at least one delay signal. The delay signal is multiplied with the corresponding weight and output by a synthesizer as a weighted output signal. The deviation between the weighted output signal and the ideal signal is then determined and fed back to determine a new weight. This is the disclosed method that uses the LMS Rule to compute the weight of the adaptive filter using the input signals and the ideal signal. From the above parameters, the invention can determine the rotor inertia ratios among the model motor, the drive motor, and the load motor.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

First, we describe the adaptive filter and the Least Mean Square (LMS) Rule used in the invention to instantly estimate the rotor inertia of a load rotor. The adaptive filter is a main element that estimates the load motor inertia. The LMS Rule is the primary algorithm used by the adaptive filter.

First, consider a single input adaptive transversal filter:

$$y_k = \sum_{l=0}^{L} w_{lk} x_{k-l} = W_k^T X_k = X_k^T W_k, \qquad (1)$$

where $Y_k$ are actual signal outputs, $X_k$ are actual signal inputs, and $W_{1k}$ are signal weights.

Figure 1:
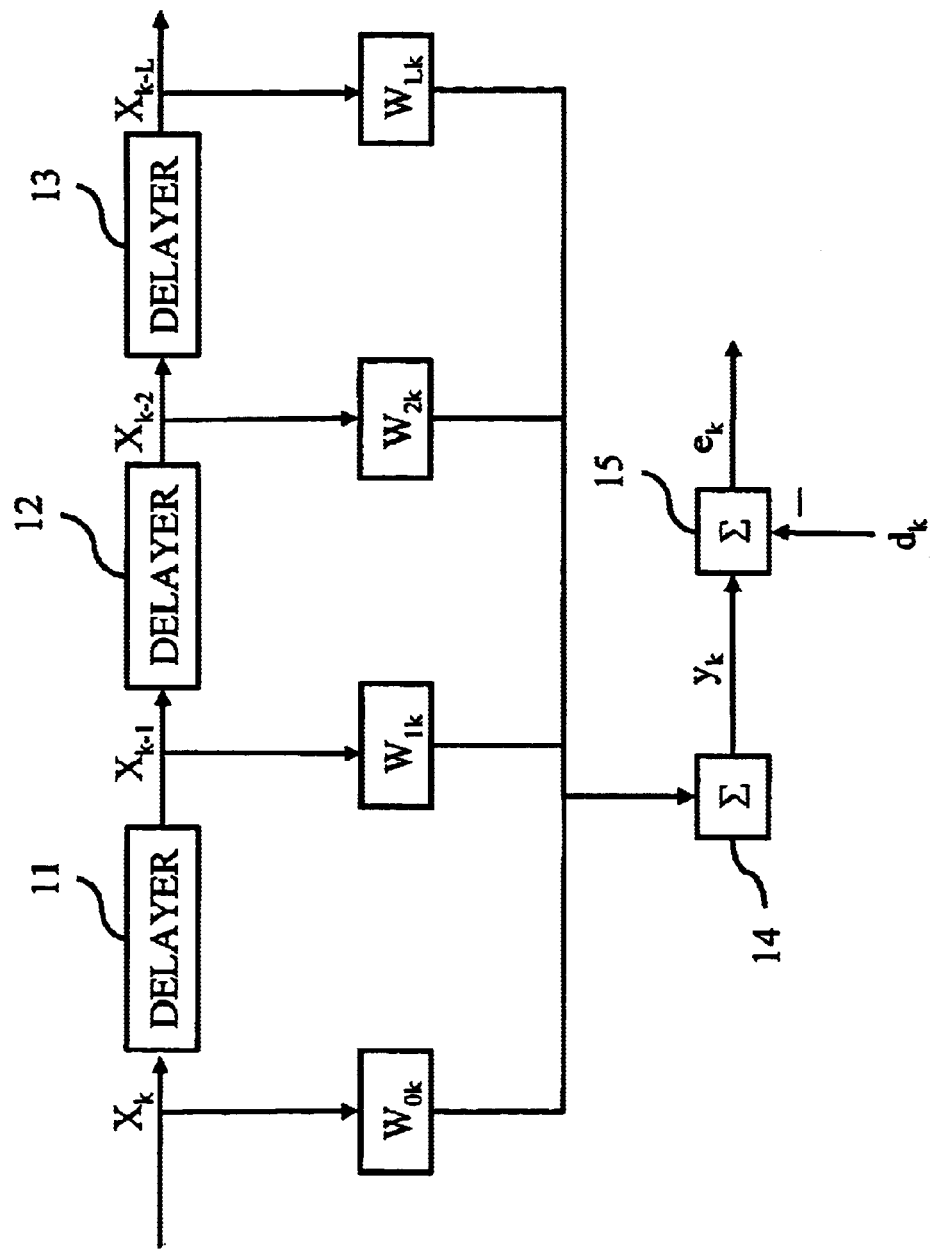
FIG. 1 is a block diagram of an adaptive filter system.

With reference to FIG. 1, $X_{k-1}$ refers to the first input delay signal after the input signal $X_k$ passes through the delayer 11. A second input delay signal $X_{k-2}$ is output after the first input delay signal $X_{k-1}$ passes the delayer 12. After passing through the Lth delayer 13, the output signal $X_k$ is output as the Lth input delay signal $X_{k-L}$. Eq. (1) is the inner product of the delay signals and the corresponding weights for a single input adaptive transversal filter. That is, the synthesizer 14 combines the delay signals and the associated weights for output. Therefore, we use $X_k = [x_k\ x_{k-1}\ \dots\ x_{k-L}]^T$ to represent the actual input signal vector and $W_k = [w_{0k}\ W_{1k}\ \dots\ W_{1k}]^T$ to represent the actual signal weight vector.

We then explain how to determine the weight of the delay signal, the desired output $d_k$ and the error signal $e_k=d_k-Y_k$. The weights of the delay signals $W_{0k}, W_{1k}, W_{2k}, \ldots$, and $W_{Lk}$ are obtained using the LMS Rule. The error signals $e_k$ are obtained by the synthesizer 15 by combining the output signals $Y_k$ and the desired outputs $d_k$. As shown in the drawing, the error signals $$e_k=d_k-y_k=d_k-X_k^T W_k. \qquad (2)$$

The error signals are estimated using the LMS Rule, according to which the square of the errors between the actual output signals $y_k$ and the desired output signals $d_k$ is the least.

We define the differential of the error square with respect to the weights of the delay signals as:

$$\hat{\nabla}_k = \left[\frac{\partial e_k^2}{\partial w_0} \ldots \frac{\partial e_k^2}{\partial w_L}\right]^T = 2e_k\left[\frac{\partial e_k}{\partial w_0} \ldots \frac{\partial e_s}{\partial w_L}\right]^T = -2e_k X_k. \qquad (3)$$

Using the steepest-descent method, the general solution can be expressed in terms of $$W_{K+1}=W_k-\mu\hat{\nabla}_k, \qquad (4)$$

where $\mu$ is the gain factor that determines the stability and convergent speed of the adaptive filter and satisfies $$0 < \mu < \frac{1}{(L+1)\left(\sum_{i=0}^{L} x_{k-1}^2\right)}$$

with L referring to the filter level.

Inserting Eq. (3) into Eq. (4), one obtains:

$$W_{k+1}=W_k+2\mu e_k X_k, \qquad (6)$$

which is the desired LMS algorithm. In other words, the error signals of the desired signals and output signals are fed back to estimate the signal weight at the next time. Therefore, when moving to the next time point, the weight associated with the delay signal also changes. Once the system reaches a stable state, the rotor inertia of the load can be estimated.

We can use the features of the adaptive filter to obtain an input signal and a desired signal from the servo control system as the input of the adaptive filter. Using the LMS Rule, the delay signal and the associated weight after the delayer are computed, thereby estimating the rotor inertia of the load.

Figure 2:
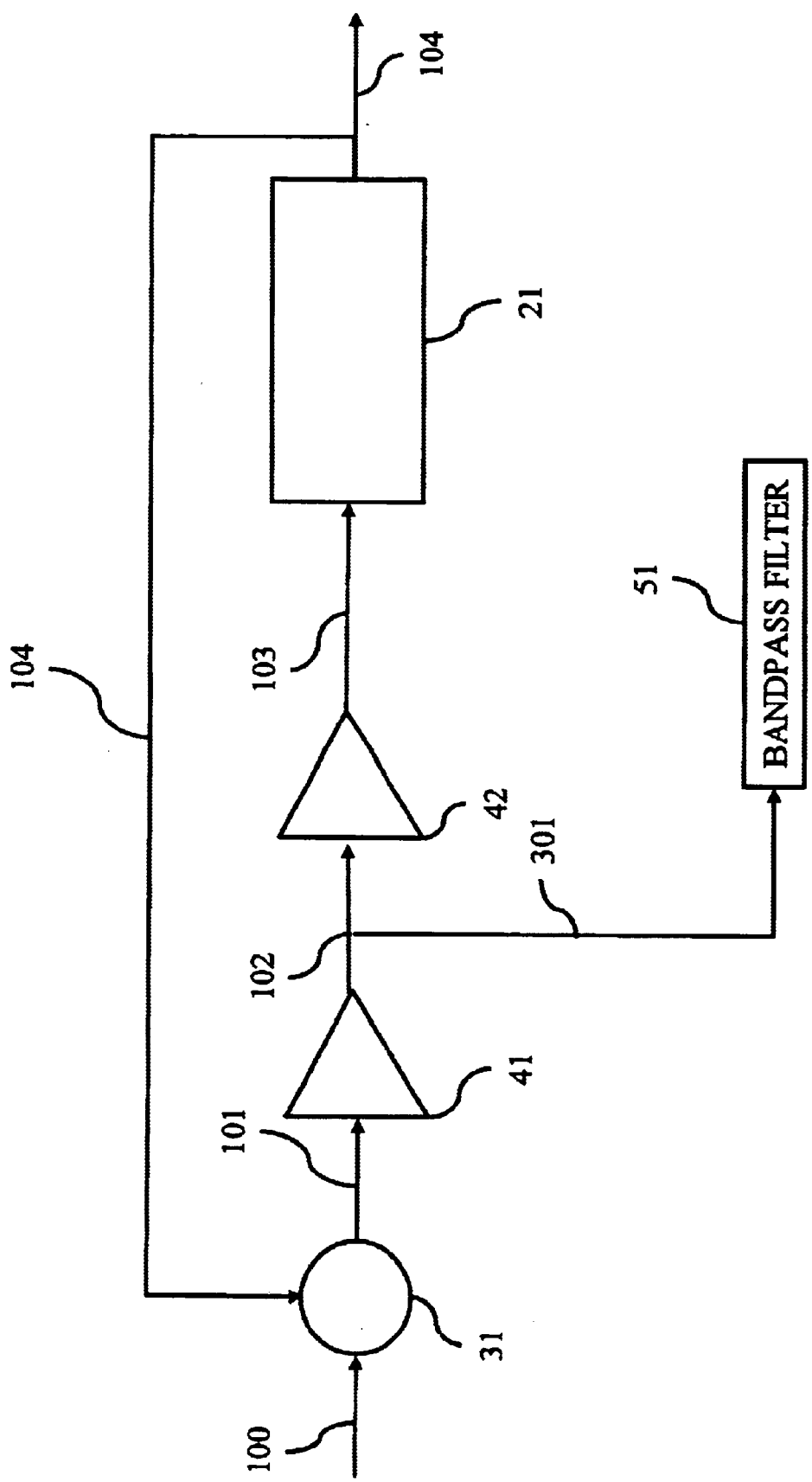
FIG. 2 is a system block diagram of the model motor used by the invention.

As shown in FIG. 2, we need to obtain a desired signal and an input signal for the formula $$e_k=d_k-y_k=d_k-X_k^T W_k.$$

The desired signal is obtained from a model motor with a known rotor inertia. As shown in FIG. 2, the speed signal 104 of the model motor is simulated by a mathematical model 21.

The speed signal 104 is fed back to a synthesizer 31. The synthesizer 31 outputs an error signal 101 according to a command signal 100 and the speed signal 104. The error signal 101 passes through a gain controller 41 to provide a gain signal 102. The gain controller 42 converts the gain signal 102 into a current signal 103. The current signal 103 is put into the mathematical model 21 to control the operation of the model motor. The model motor with a known rotor inertia refers to a system model with known parameters. We use the known parameters in the system model to compare with the actual system. The input signal 301 is the gain signal 102 output from the gain controller 41 and output to a band pass filter 51.

Figure 3:
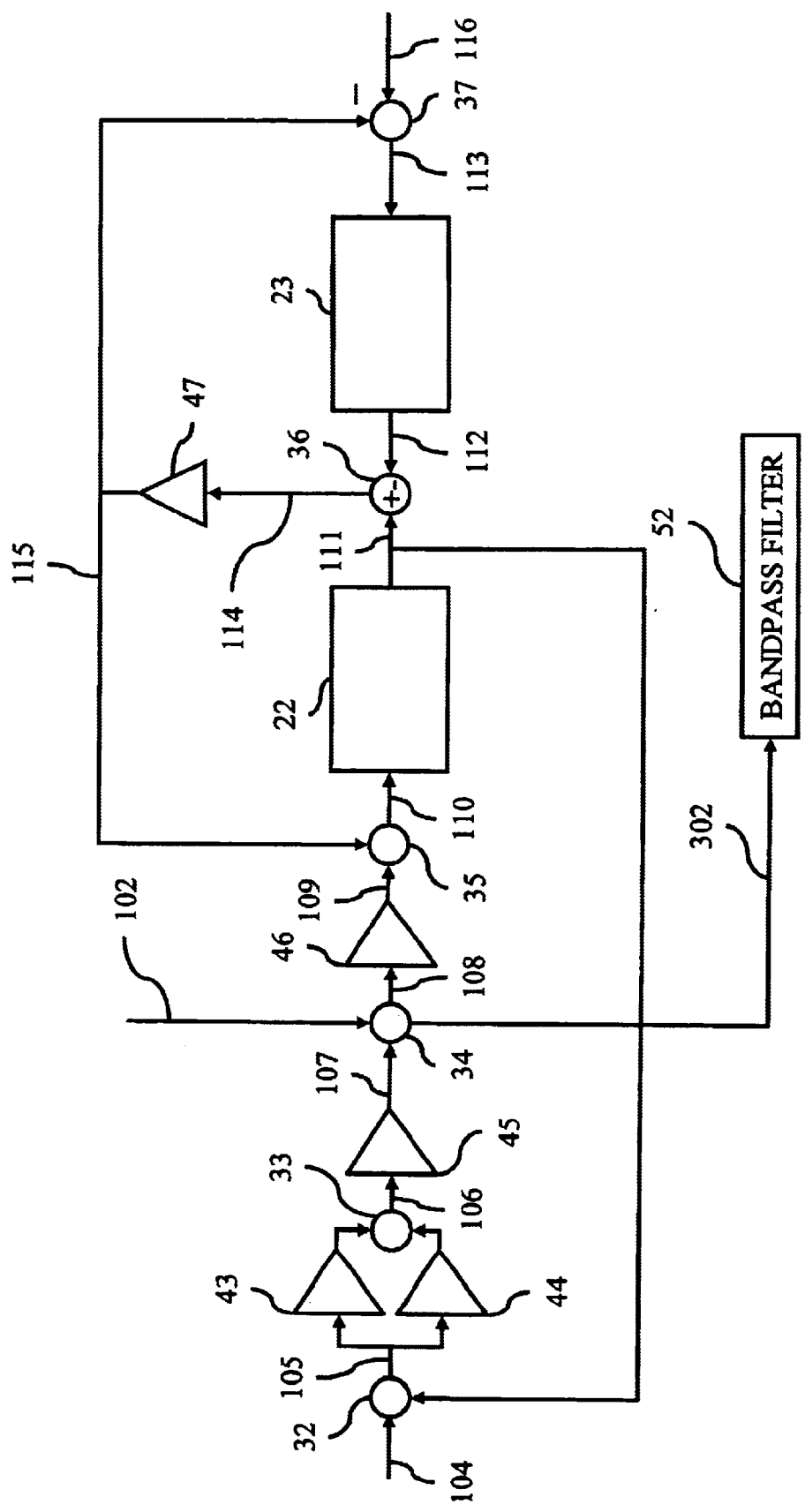
FIG. 3 is a system block diagram of the drive motor and the load motor.

The source of the desired signal is shown in FIG. 3. The speed signal 111 (the first speed signal) output from a mathematical model 22 of the drive motor and the speed signal 112 (the second speed signal) output from a mathematical model 23 of the load motor are combined by the synthesizer 36 into a synthesized speed signal 114. The synthesized speed signal 114 is then magnified by a gain controller 47 into a gain signal 115, which is then fed back to the synthesizer 35 and the synthesizer 37.

After the synthesizer 35 combines the gain signal 109 and the gain signal 115, a synthesized signal 110 is output to control the speed in the mathematical model 22 of the driver motor. Likewise, the synthesizer 37 combines the gain signal 115 and the gain signal 116 and outputs a synthesized signal 113 to drive the load motor 23. The gain signal 116 is similar to the gain signal 109.

The desired signal comes from the synthesized signal 108 of the synthesizer 34. The synthesized signal 108 is obtained by combining the gain signal 107 and the gain signal 102. After the gain controller 46, the synthesizer signal 108 is output as the gain signal 109. The gain signal 107 is output by the gain controller 45. Therefore, the desired signal is obtained from the synthesized signal 108 that is output by the synthesizer 34 by combining the gain signal 102 and the gain signal 107. The gain signal 107 comes from the error signal 105 associated with the speed signal 104 output from the mathematical model 21 of the model motor and the speed signal 111 output from the mathematical model 22 of the drive motor. It is output by the synthesizer 32. The error signal 105 first passes through respectively a proportion controller (P controller) 43 and an integration controller (1 controller) 44 and then a synthesizer 33 to form a synthesized signal 106. The synthesized signal 106 is output by the gain controller 45 as the gain signal 107. Therefore, the synthesizer 34 can combine the gain signal 107 along with the gain signal 102 into the desired signal 302 for output. The desired signal 302 is output to a band pass filter 52 to estimate the rotor inertia of the load motor.

Figure 4:
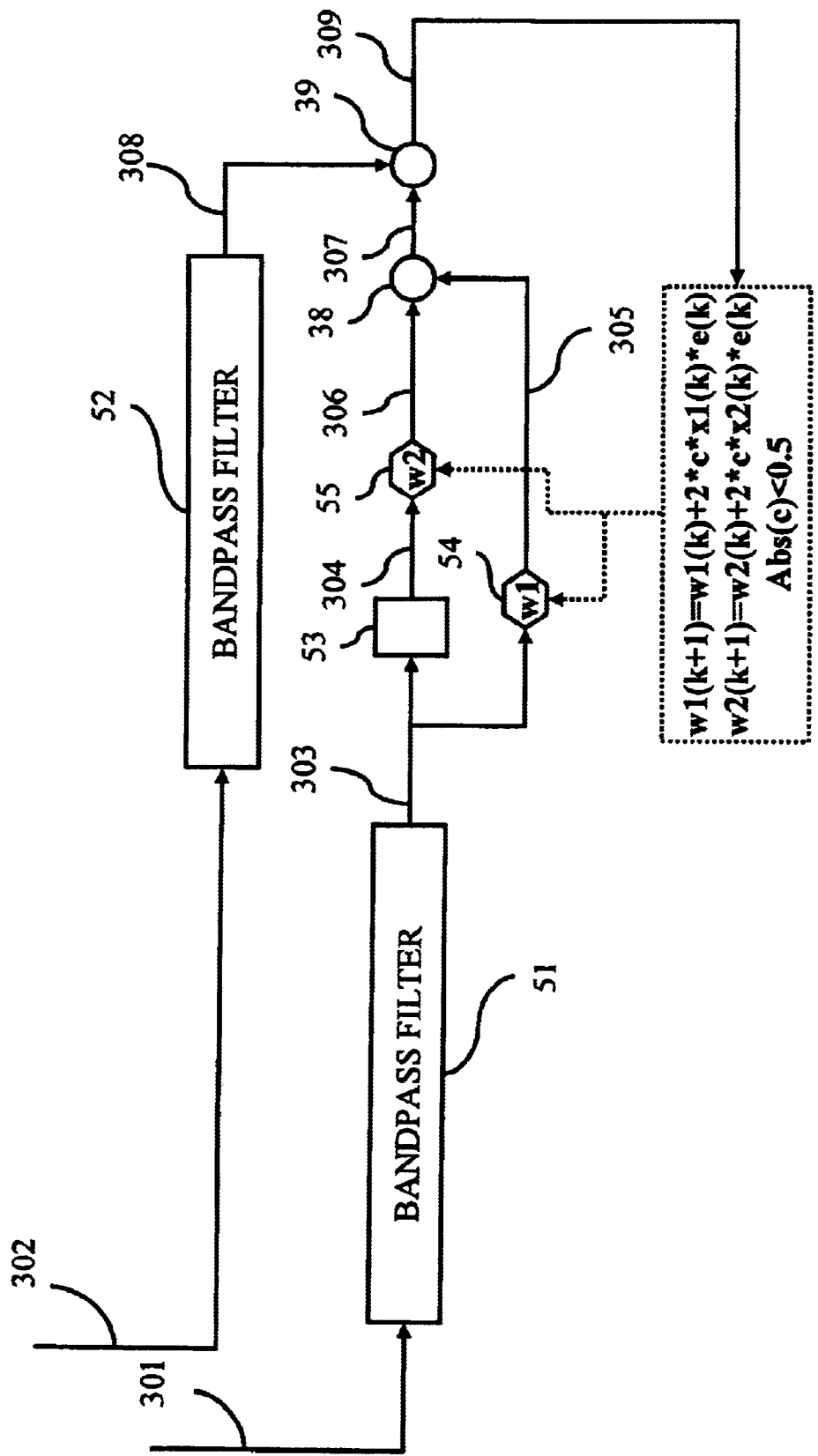
FIG. 4 is a system block diagram for estimating the load rotor inertia.

After the system determines the input signal 301 and the desired signal 302, it then performs the estimate of the load rotor inertia. FIG. 4 shows the block diagram of the system for estimating the load rotor inertia. The output signal of the adaptive filter shown in FIG. 2 can be computed by first obtaining delay signals from several delayers and then multiplying them by the corresponding weights. In the current embodiment, one delayer is used for the estimation.

After the input signal 301 passes through the band pass filter 51, a filtered input signal 303 is sent out. A delayed input signal 304 is output by the delayer 53. There are two multipliers 54, 55 in the drawing. They output weighted output signals 307. The filtered input signal 303 and the delayed input signal 304 are weighted by the corresponding weights and become the weighted input signal 305 and the weighted delay input signal 306, which are then combined by the synthesizer 38 into the weighted output signal 307. The weighted input signal 305 is obtained by multiplying the Xk signal by the corresponding weight. The weighted delay input signal 306 is obtained by multiplying the (Xk−1) signal by the corresponding weight.

After the desired signal enters the band pass filter 52, a filtered ideal signal 308 is sent out. The synthesizer 39 combines the weighted output signal 307 with the filtered ideal signal 308 to output a synthesized signal 309. The synthesized signal 309 is used to compute using Eq. (6) the weights w1, w2 at the next level, which are fed back to the multipliers 54, 55, respectively. The input signal 301 and the desired signal 302 are sent to the band pass filter for obtaining the signal to be estimated.

Therefore, when the drive motor drives the load motor, the model motor current signal 301 and the error 302 synthesized from the drive motor and model motor current signals are obtained. The adaptive filter estimates and output the synthesized signal 309, so that the current at a later time is determined by the output from the previous moment, thereby adjusting the synthesized signal 309 to tune the weights w1, w2. The weight at the next moment is the sum of twice the product of the gain constant, the synthesized signal 309 (the error between the weighted output signal and the ideal signal) and the input signal 301, and the weight at the previous moment. In other words, the weight of the filtered input signal 303 w1(k+1)=w1(k)+2*c*×1(k)*e(k) and the weight of the delayed input signal 304 is w2(k+1)= w2(k)+2*c*×2(k)*e(k).

The disclosed method uses a band pass filter with the characteristic factor 50*2*pi/(s+50*2*pi)*s/(s+2*2*pi) as an example. Its convergent constant is less than 0.5.

Figure 5:
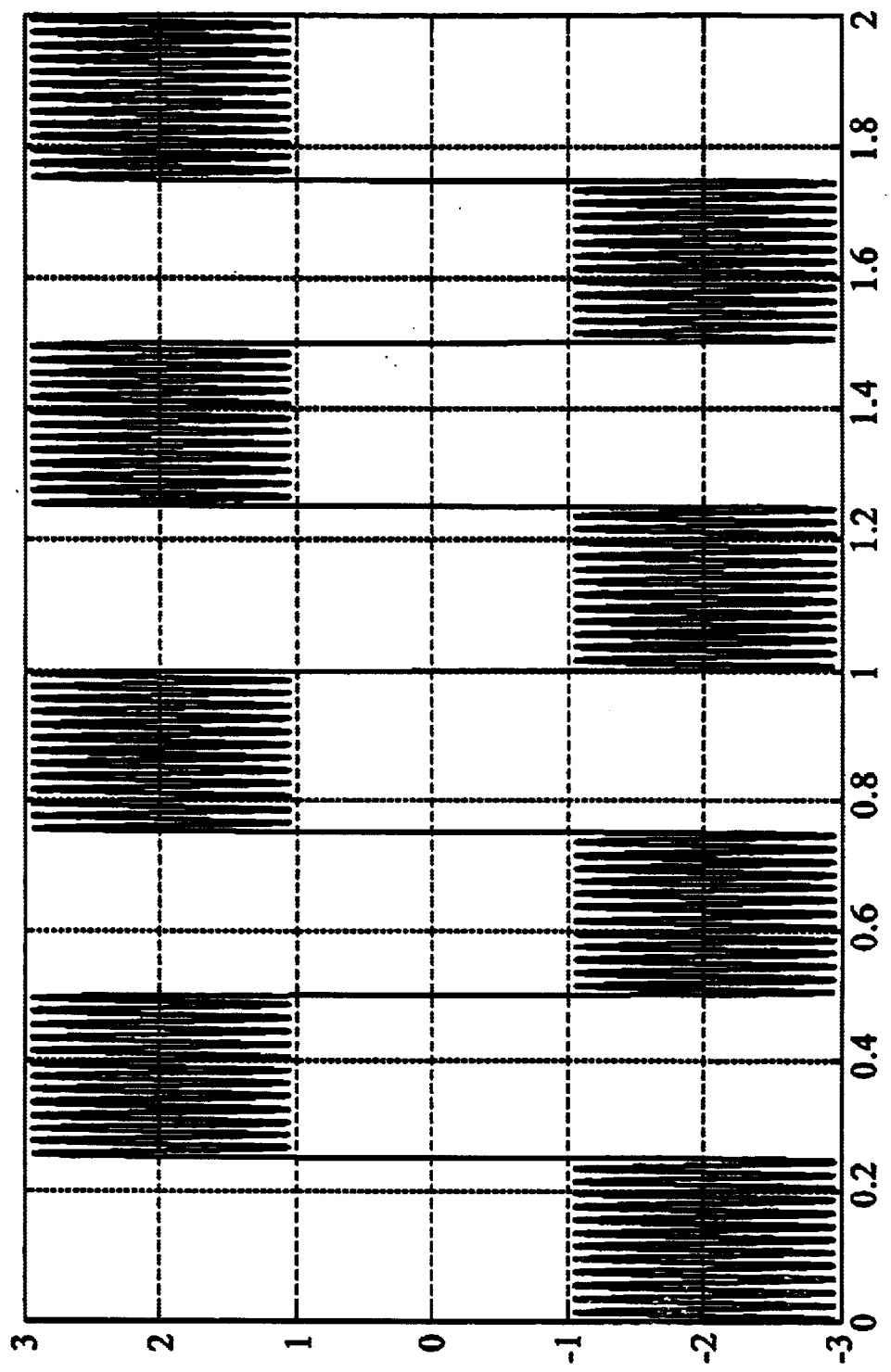
FIG. 5 is a time response diagram of speed command inputs.
Figure 6:
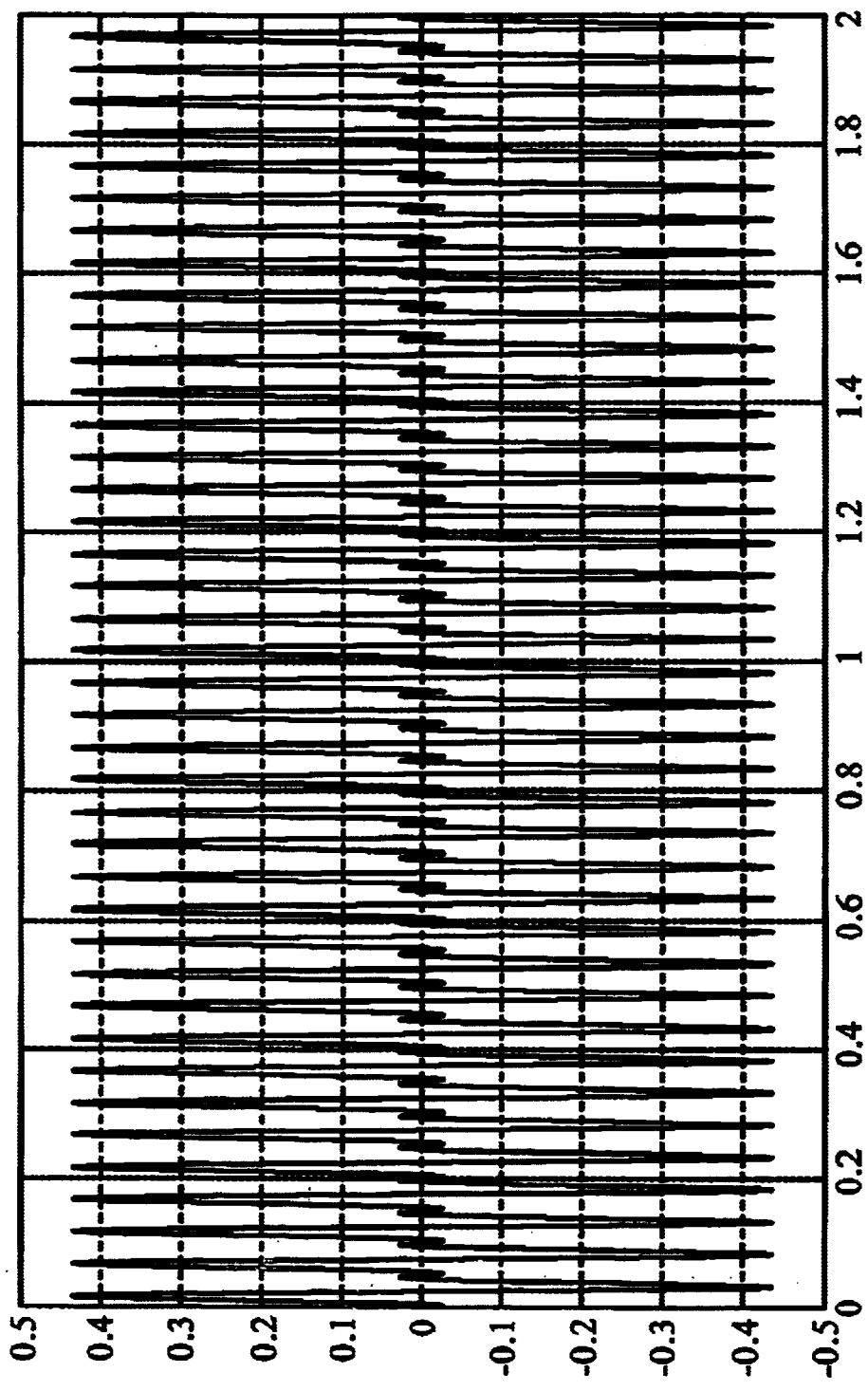
FIG. 6 is a time response diagram of external torque perturbations.

In the following paragraphs, we provide several simulated and experimented embodiments. FIG. 5 is the time response diagram of speed command inputs. FIG. 6 is the time response diagram of external torque perturbations. The test conditions are in accord with those in Attachments 1 and 2, where J is the rotor inertia of the drive motor, Jm is the rotor inertia of the model motor, JL is the rotor inertia of the load motor, and G is the speed control circuit gain of the AC servo driver.

First Embodiment

Figure 7:
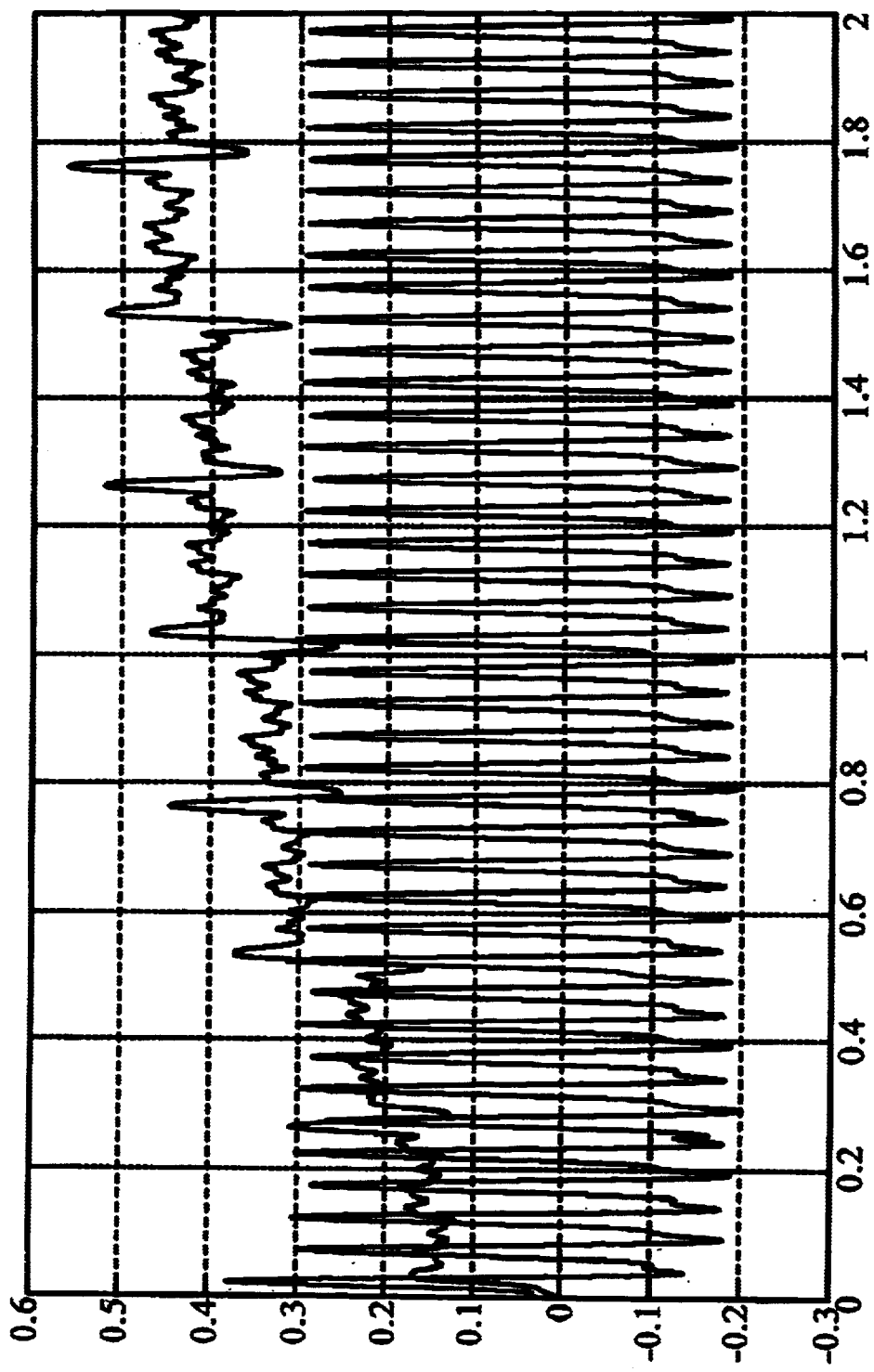
FIG. 7 is a time response diagram of the disclosed first embodiment.

J=9e-5, G=1, Jm=2J, and JL=J. The estimated result W1+W2≈0.8 with its time response diagram shown in FIG. 7.

Second Embodiment

Figure 8:
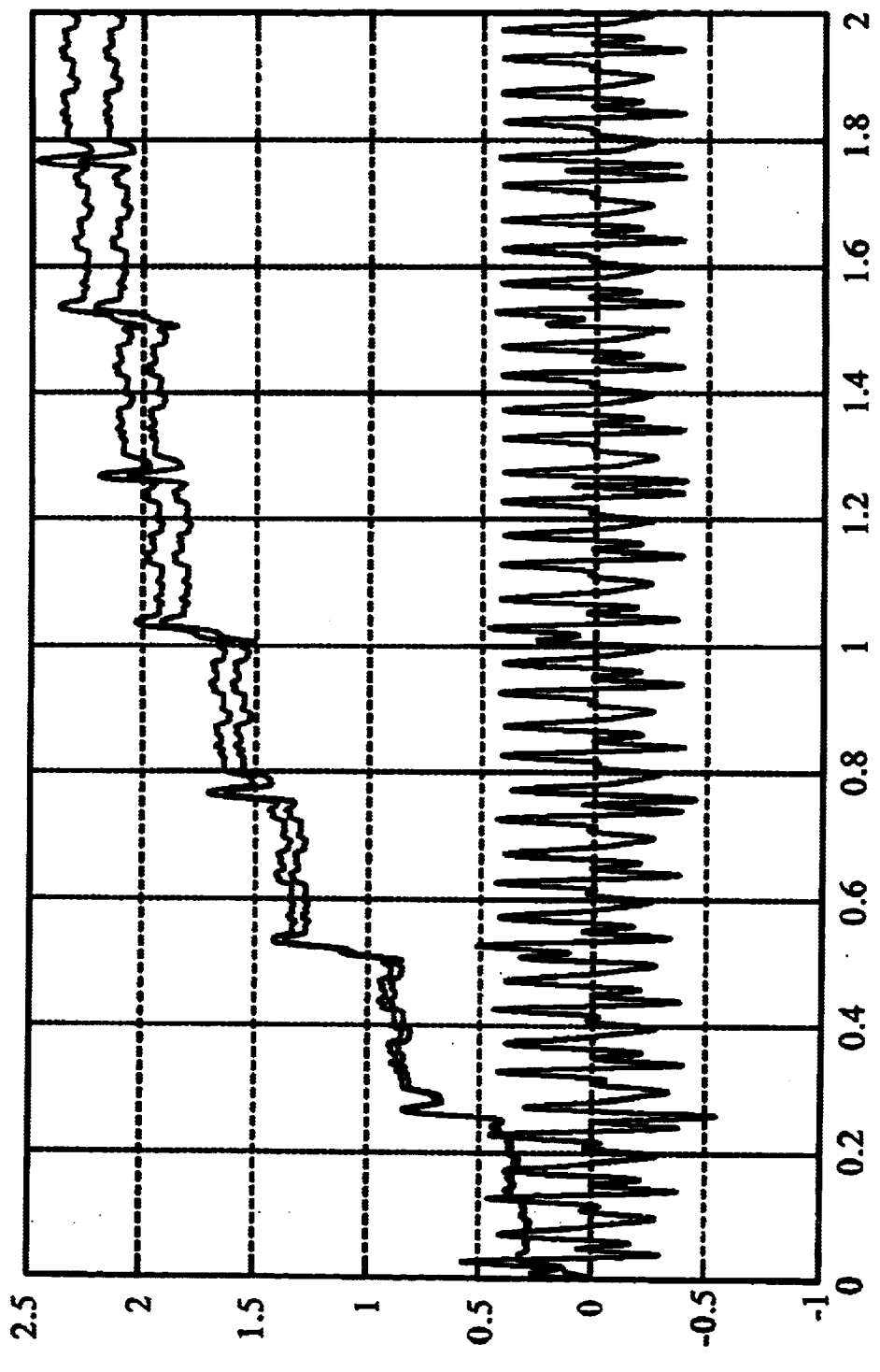
FIG. 8 is a time response diagram of the disclosed second embodiment.

J=9e-5, G=1, Jm=2J, and JL=10J. The estimated result W1+W2≈4.5 with its time response diagram shown in FIG. 8.

Third Embodiment

Figure 9:
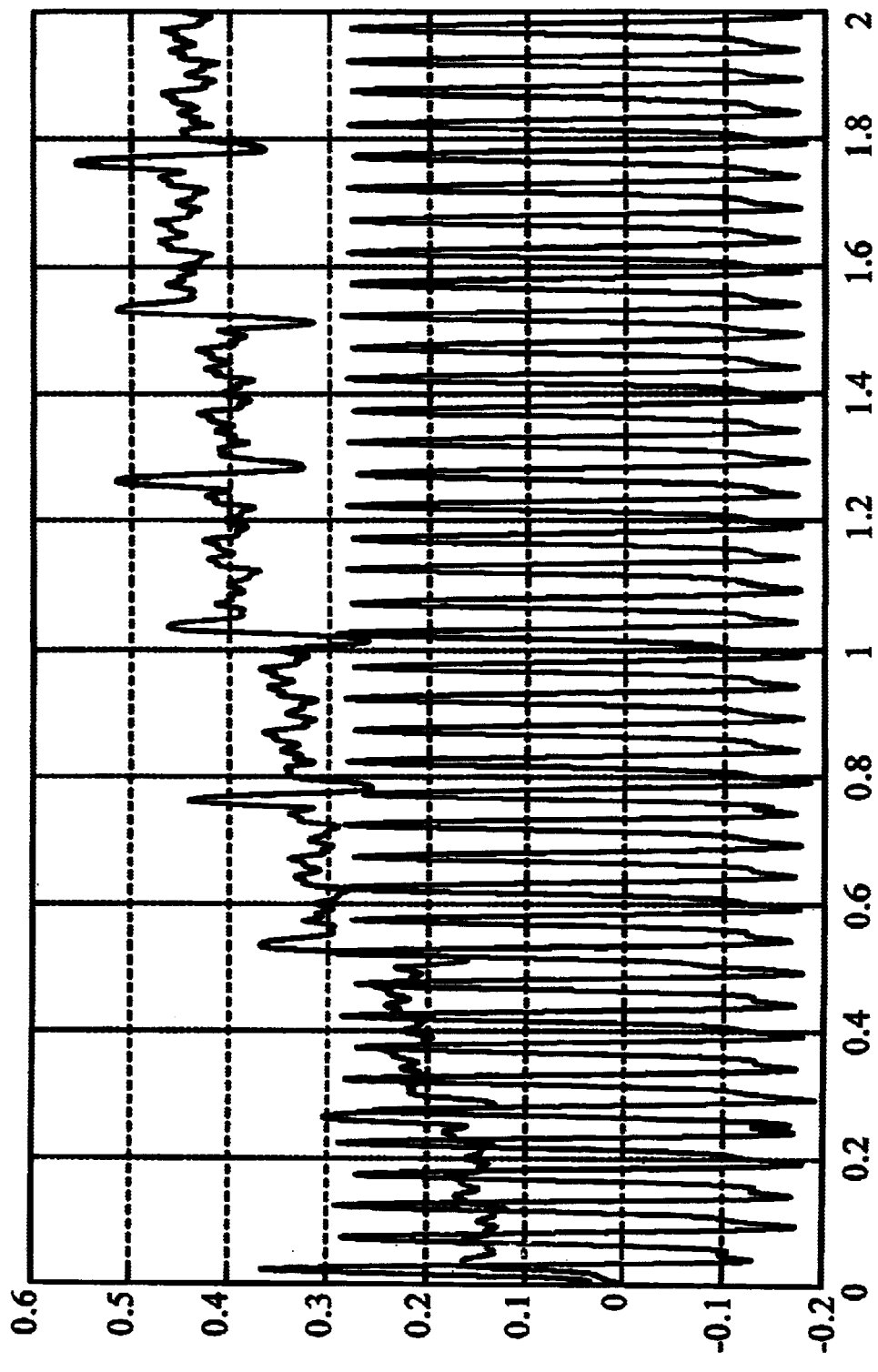
FIG. 9 is a time response diagram of the disclosed third embodiment.

J=9e-5, G=10, Jm=2J, and JL=J. The estimated result W1+W2≈0.9 with its time response diagram shown in FIG. 9.

Fourth Embodiment

Figure 10:
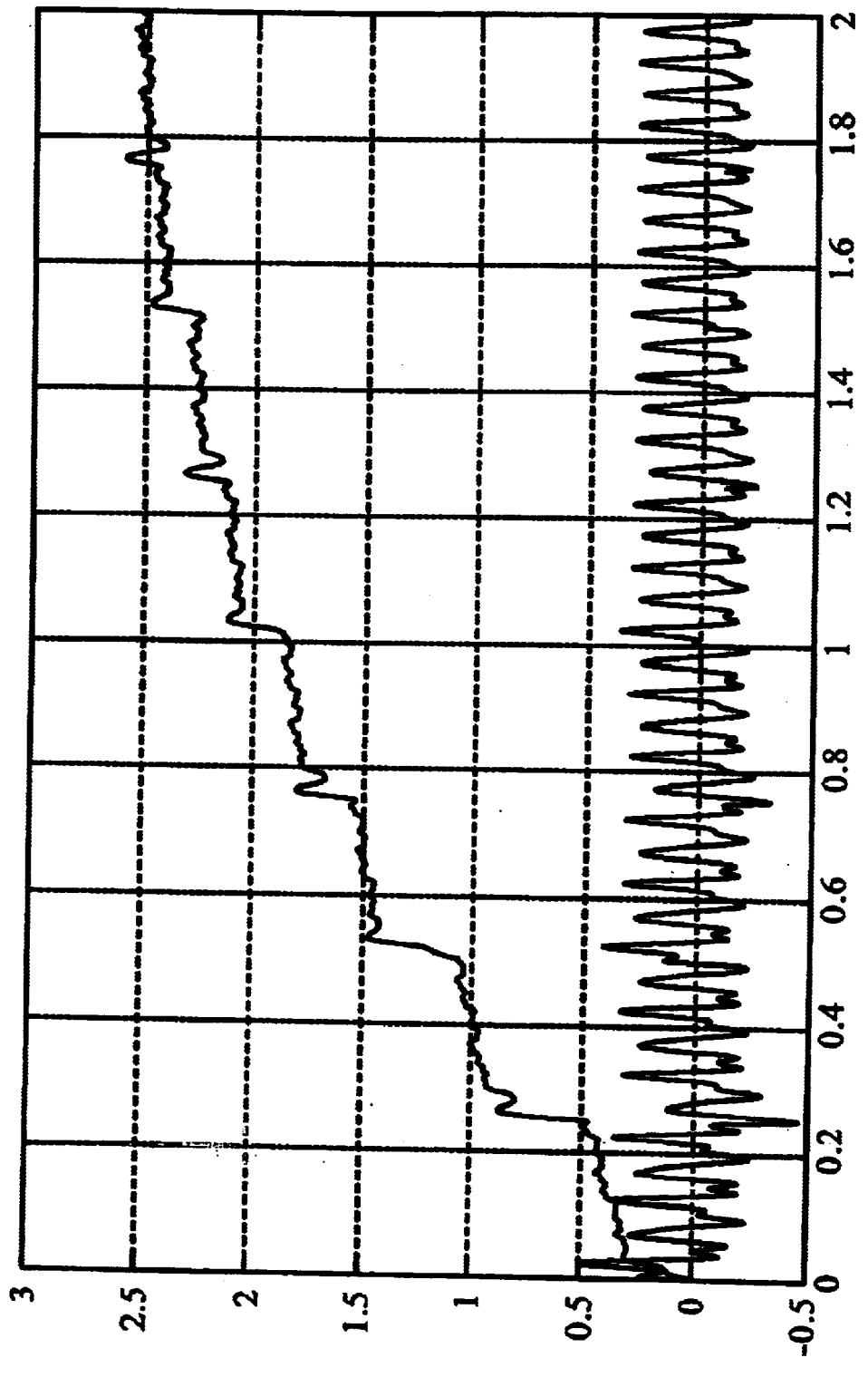
FIG. 10 is a time response diagram of the disclosed fourth embodiment.

J=9e-5, G=10, Jm=2J, and JL=10J. The estimated result W1+W2≈5 with its time response diagram shown in FIG. 10.

From the above four embodiments, we see that the frequencies of the speed command and the external pertur- bation can be set approximately the same such that the load rotor inertia estimate can still be performed. Comparing the four embodiments, we know that different controller gains do not have significant influence on the estimated results.

The disclosed method can use the adaptive LMS Rule to immediately estimate the load inertia of a rotor. Therefore, it is of great utilities and practical values.

Certain variations would be apparent to those skilled in the art, which variations are considered within the spirit and scope of the claimed invention.

What is claimed is:

1. A method of instant estimation of the rotor inertia of a load motor used in a servo control system with a controlled object, the method comprising the steps of:

referring to a model motor to determine an input signal of an adaptive filter according to the current signal of the model motor;

determining a desired signal of an adaptive filter according to the error between a drive motor current signal and the model motor current signal;

obtaining a plurality of delay signals according to the input signal and multiplying the delay signals by the corresponding weights to output a weighted output signal;

determining the error between the weighted output signal and the desired signal; and determining by the adaptive filter the rotor inertia of the servo control system according to the input signal and the desired signal using the Least Mean Square (LMS) Rule.

2. The method of claim 1, wherein the rotor inertia of the model motor is known.

3. The method of claim 1 further comprising the step of passing the input signal through a band pass filter and obtaining a filtered input signal before the step of obtaining the delay signals.

4. The method of claim 1 further comprising the step of passing the desired signal through a band pass filter and obtaining a filtered ideal signal before the step of determining the error signal.

5. The method of claim 1, wherein the weights vary with time.

6. The method of claim 5, wherein the weight at the next moment is the sum of the weight at the current moment and twice the product of a gain factor, the input signal, and the error signal.

7. The method of claim 6, wherein the gain factor is the gain factor of the adaptive filter.

8. The method of claim 1, wherein the rotor inertia of the servo control system is the ratio of the sum of the load motor rotor inertia and the drive motor rotor inertia to the model motor rotor inertia.

* * * * *